United States Patent [19]

Kudo et al.

[11] Patent Number: 5,008,128

[45] Date of Patent: Apr. 16, 1991

[54] PROCESS FOR PRODUCING INFORMATION RECORDING MEDIUM

[75] Inventors: Takanori Kudo, Hachioji; Heigo Ishihara, Tokyo, both of Japan

[73] Assignee: Hitachi, Ltd., Japan

[21] Appl. No.: 304,086

[22] Filed: Jan. 31, 1989

[30] Foreign Application Priority Data

Feb. 3, 1988 [JP] Japan .................................. 63-21956
Jul. 18, 1988 [JP] Japan .................................. 63-177156

[51] Int. Cl.$^5$ ............................................ H01F 10/02
[52] U.S. Cl. ..................................... 427/130; 427/131
[58] Field of Search ................................ 427/131, 130

[56] References Cited

U.S. PATENT DOCUMENTS 3,810,874 5/1974 Mitsch et al. ..................... 260/75 H

FOREIGN PATENT DOCUMENTS 62-145533 6/1987 Japan .
62-187798 8/1987 Japan .

Primary Examiner—Bernard Pianalto
Attorney, Agent, or Firm—Pennie & Edmonds

[57] ABSTRACT

A fluorine-containing isocyanate derivative, wherein the isocyano group of the fluorine-containing isocyanate is protected, a fluorine-containing polymer having at least one acylazido group, a process for producing an information recording medium by applying a lubricant comprising the fluorine-containing isocyanate derivative or the fluorine-containing polymer having at least one acylazido group to a magnetic layer formed on a substrate directly or through an underlayer, or to a protective layer formed on the magnetic layer, then reproducing or forming an isocyano group and subjecting the isocyano group to polymerization, thereby forming a fluorine-containing isocyanate polymer layer, an information recording medium produced according to the process and an apparatus for information recording, using the information recording medium are disclosed.

The lubricant is resistant to water and no polymerization proceeds before the formation of a lubricant layer, and a lubricant layer without defects is obtained with the lubricant and an information recording medium with good sliding characteristics is obtained.

10 Claims, 3 Drawing Sheets

PROCESS FOR PRODUCING INFORMATION RECORDING MEDIUM

BACKGROUND OF THE INVENTION

This invention relates to a process for forming a fluorine-containing isocyanate polymer film for use as a lubricant layer of information recording media such as magnetic disks, magnetic tapes, magnetic cards, magnetic drums, etc; fluorine-containing isocyanate derivatives and fluorine-containing polymers with acylazido group as raw materials for the lubricant layer and an information recording apparatus using the information recording medium.

Generally, the surface of a magnetic recording medium is subject to wearing due to a magnetic recording head, etc. during the recording or reproduction. In order to prevent a decrease in the recording or reproducing capacity due to the wearing, it is known to form a lubricant layer on the surface of a magnetic recording medium.

It is also known in the relevant technical field to use fluorine-containing compounds such as perfluoropolyether, etc. as a lubricant layer material and perofluoropolyethers with a isocyano group at the terminals are also well known (U.S. Pat. No. 3,810,874).

It is also known to use fluorine-containing isocyanates as a lubricant for a magnetic recording medium [Japanese Patent Application Kokai (Laid-open) No. 62-145533] and use fluorine-containing polyurethanes formed from an isocyanate and a polyhydric alcohol [Japanese Patent Application Kokai (Laid-open) No. 62-187798].

Furthermore, it is known that an isocyanate forms an adduct with an active hydrogen compound such as phenol, alcohol, etc., and is stabilized against water [O. Bayer: Angew. Chem., A59, 265 (1947)].

In the aforementioned prior art, no consideration has been given to the stability of the production process when a fluorine-containing isocyanate is used as a lubricant layer of a magnetic recording medium. That is, the fluorine-containing isocyanate has a short pot life and still has problems to be solved, for example, occurrence of defects on the lubricant layer due to deposition of solidified lubricant, etc. when the fluorine-containing isocyanate preserved for over the pot life is used.

SUMMARY OF THE INVENTION

An object of the present invention is to provide a process for forming a lubricant layer of an information recording medium such as a magnetic recording medium, etc. with a good process stability and without less occurrence of defects.

Other objects of the present invention are to provide an information recording medium produced according to the present process; an information recording apparatus; and lubricants as raw materials for the lubricant layer.

The first object of the present invention can be attained by using a fluorine-containing isocyanate derivative, where the isocyano group of the fluorine-containing isocyanate is protected, as a lubricant; applying the lubricant to the surface of an information recording medium; heating the lubricant-applied medium, thereby reproducing the isocyano group; and then subjecting the reproduced isocyano group to polymerization.

Fluorine-containing isocyanates have not only a short pot life, but also problems of occurrences of defects on the lubricant layer, etc., when used as a lubricant for the magnetic recording medium. As a result of extensive studies to solve the problems, the present inventors have found that the fluorine-containing isocyanates undergo hydrolysis or polymerization due to the water in air. In order to prevent the hydrolysis or polymerization, the present inventors have proposed to protect the isocyano group of the fluorine-containing isocyanates tentatively.

Protection of isocyano group is known among the isocyanate compounds of hydrocarbon system. However, the fluorine-containing isocyanate compounds are different from the isocyanate compounds of hydrocarbon system in the reactivity with reaction reagents, compatibility, etc. and are hard to synthesize. Thus, no examples of synthesis have been disclosed yet.

The present inventors have studied a process for the synthesis and have prepared fluorine-containing isocyanates, where the isocyano group is protected.

The present fluorine-containing isocyanate derivatives have a longer pot life, when used as a lubricant for a magnetic recording medium, and reduce the occurrence of defects. Furthermore, the present derivatives are also effective for improving the sliding characteristics of a magnetic recording medium. It seems that the improved sliding characteristics are due to an increase in the cross-linking density of the fluorine-containing isocyanate.

The present lubricant is stable against water when applied to a substrate, because the isocyano groups are protected with protective groups comprising active hydrogen compounds such as an alcohol, a phenol, etc., and the isocyano groups are reproduced by a heat treatment, thereby dissociating the protective groups. The reproduced fluorine-containing isocyanates can undergo hydrolysis and polymerization to form a desired lubricant layer.

The fluorine-containing isocyanate for use as a lubricant in the present process for forming a lubricant layer of a magnetic recording medium is selected from compounds having a fluoropolyether chain or a fluoroalkyl chain as a basic structure and having at least one isocyano group, where the fluoropolyether chain or fluoroalkyl chain can be not only linear, but also branched. The fluorine-containing isocyanate includes, for example, -continued

OCNCH₂[(CF₂O)ₙ(CF₂CF₂O)ₘ]CH₂NCO,

OCN[(CF₂O)ₙ(CF₂CF₂O)ₘ]NCO,

C₉F₁₉—⟨O⟩—NCO,

C₇F₁₅(CH₂)₁₁NCO, etc.

The compounds for use to protect the isocyano groups (-NCO) of these fluorine-containing isocyanates include, for example, alcohols, phenols, diketones, carboxylic diesters, heterocyclic compounds, etc. and specifically include methanol, ethanol, t-butyl alcohol, m-cresol, acetylacetone, malonic diester, ethylenediimine, acetoacetic ester, pyrrole, benzotraizole, etc.

With these compounds the isocyano groups can be protected according to the following reactions:

, where -Rf- is a divalent organic group containing a fluorine atom, Me is a methyl group, Et is an ethyl group and ᵗBu is a t-butyl group.

In the foregoing, fluorine-containing isocyanates containing two isocyano groups in one molecule are exemplified, and it is needless to say that the isocyano groups of the compounds having one isocyano group or three or more isocyano groups in one molecule can be protected in the same manner as described above.

A solvent mixture of a fluorine-based solvent and a hydrogen-based solvent may be used in the foregoing reaction as a reaction solvent.

The fluorine-based solvent includes, for example, fluorocarbons, fluorochlorocarbons, etc. and specifically includes trichlorotrifluoroethane, perfluoro-2-butyltetrahydrofuran, perfluoroheptane, etc.

The hydrocarbon-based solvent includes, for example, ethers, hydrocarbons, etc., and specifically includes diethylether, diethyleneglycoldimethylether, tetrahydrofuran, benzene, toluene, etc.

In the reaction, the foregoing solvents can be used alone or in their mixture. Furthermore, it is possible to dissolve the reactants in a fluorine-based solvent and a hydrocarbon-based solvent, respectively and subject the reactants in the individual solution forms to the reaction.

The fluorine-containing isocyanate and the protecting agent undergo reaction substantially stoichiometrically, through somewhat dependent upon the drying state, stirring condition, etc. of the reaction system.

Thus, a ratio of the compounds to be charged is preferably in a range of 0.5 to 2 in terms of ratio by equivalent weight in view of easiness in the removal of unreacted compounds.

In the foregoing reaction, potassium t-butoxide, triethylamine, dibutyltindilaurate, cobalt 2-ethylhexanoate, etc. may be used as a catalyst. The satisfactory amount of the catalyst is $10^{-1}$ to $10^{-4}$ equivalent weight on the basis of the fluorine-containing isocyanate.

The reaction product can be purified according to a well known procedure, for example, by extraction, distillation, liquid chromatography, etc.

Figure 3:
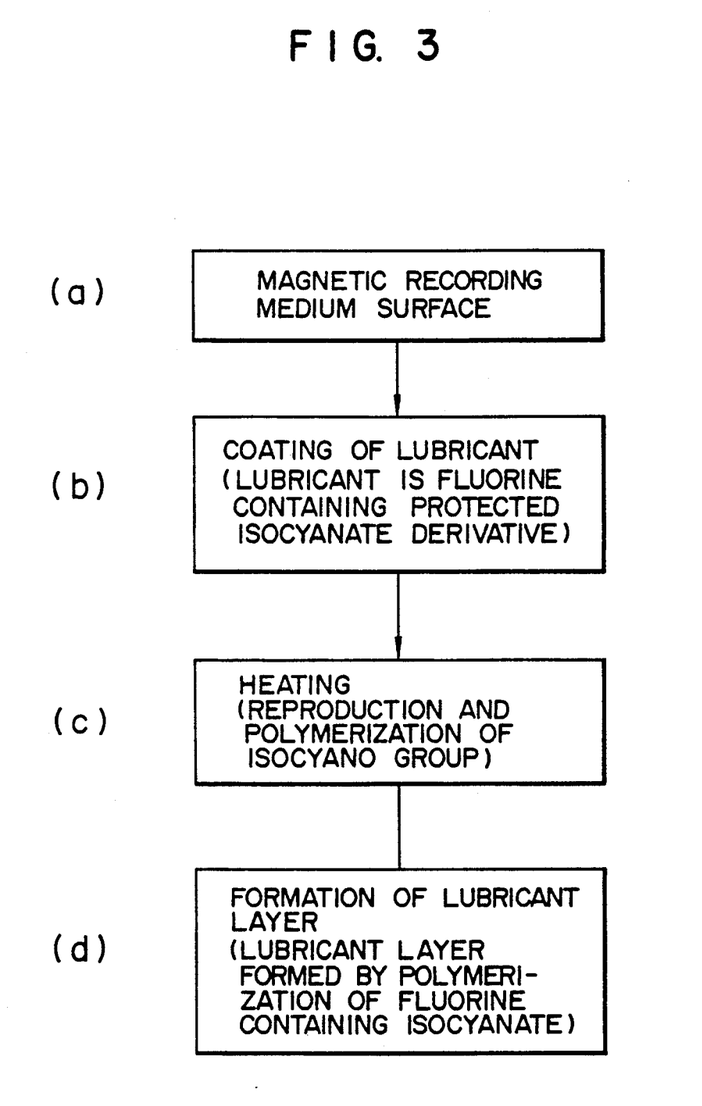

The fluorine-containing isocyanate derivative thus synthesized can be applied, as shown in FIG. 3(a) to (d), to the surface of a magnetic recording medium [FIG. 3(a)], for example, directly or in a solution state by spray-wiping, dipping, spin coating, etc. [FIG. 3(b)].

The isocyano groups of the fluorine-containing isocyanate derivative deposited on the surface of the medium are reproduced by heating and undergo polymerization on the surface of the medium [FIG. 3(c)], resulting in formation of a lubricant layer comprising the fluorine-containing isocyanate polymer [FIG. 3(d)].

The temperature required for the reproduction and polymerization of the isocyano groups depends upon the species of fluorine-containing isocyanate derivatives, and is preferably in a range of 100° to 200° C., because the reaction proceeds slowly at a lower temperature, whereas deterioration of the medium is liable to occur at a higher temperature.

In the present invention, it is important to use a fluorine-containing isocyanate derivative, whose isocyano group is protected against water, and the isocyanate derivatives synthesized according to different processes than the aforementioned one can be also used.

The foregoing object of the present invention can be also attained by using a fluorine-containing polymer having at least one acylazido group as a lubricant and applying the polymer to the surface of a magnetic recording medium, then forming isocyano groups by heat treatment and subjecting the thus formed isocyano groups to polymerization, thereby forming a lubricant layer comprising the fluorine-containing isocyanate polymer.

Fluorine-containing isocyanates have not only a short pot life, but also problems of occurrences of defects on the lubricant film, etc., when used as a lubricant for the magnetic recording medium. As a result of extensive studies to solve the problems, the present inventors have found that the fluorine-containing isocyanates undergo hydrolysis or polymerization due to the water in air. Thus, the present inventors have made further studies to prevent the hydrolysis or polymerization and have found that a homogeneous lubricant layer comprising a fluorine-containing isocyanate polymer with less occurrence of defects can be formed by applying a fluorine-containing polymer having at least one acylazido group to the surface of a magnetic recording medium, then decomposing the acylazido group of the fluorine-containing polymer on the medium by heating, thereby forming an isocyano group, and subjecting the thus formed isocyano group to polymerization.

The present fluorine-containing polymer having at least one acylazido group has a longer pot life, when used as a lubricant for a magnetic recording medium, and reduces the occurrence of defects. Furthermore, the present inventors have found that the present polymer is also effective for improving the sliding characteristics of a magnetic recording medium. It seems that the improved sliding characteristics are due to an increase in the cross-linking density of the fluorine-containing isocyanate polymer.

The present invention further provides a magnetic recording medium which comprises a substrate, a magnetic layer formed on the substrate directly or through an underlayer, a protective layer formed on the magnetic layer and a lubricant layer formed on the magnetic layer or the protective layer by applying a lubricant comprising a fluorine-containing polymer having at least one acylazido group to the surface of the magnetic layer or the protective layer, followed by heat treatment.

The present invention still furthermore provides a process for producing a magnetic recording medium comprising a substrate, a magnetic layer formed on the substrate directly or through an underlayer, a protective layer formed on the magnetic layer, and a lubricant layer formed on the magnetic layer or the protective layer, which comprises applying a lubricant comprising a fluorine-containing polymer having a fluoropolyether chain or an alkyl chain as a basic skeleton and at least one acylazide group, then heating the polymer to a temperature of 100 to 200° C., thereby forming an isocyano group on the fluorine-containing polymer, and subjecting the thus formed isocyano group to polymerization, thereby forming a lubricant layer comprising the fluorine-containing isocyanate polymer on the magnetic layer or the protective layer.

The lubricant as a raw material for forming the present lubricant layer is fluorine-containing polymers having at least one acylazido group represented by the following general formula:

(I), or (II)

, wherein Rf- and -Rf'- are fluorine-containing carbon groups selected from perfluoropolyether groups and perfluoroalkyl groups, and it is preferable that Rf- and -Rf'-, which constitute the fluorine-containing polymers having at least one acylazido group represented by the foregoing general formula (I) or (II), are fluorine-containing carbon groups selected from:

wherein p, q, r and s are integers of 3 to 100.

The lubricant for forming the lubricant layer of the present magnetic recording medium is a fluorine-containing polymer having at least one acylazido group and thus is stable against water when applied to the surface of a medium. Then, the nitrogen is dissociated from the acylazido group by heat treatment to form an isocyano group, and the resulting fluorine-containing isocyanate undergoes hydrolysis and polymerization to form the desired lubricant layer comprising the fluorine-containing isocyanate polymer.

The fluorine-containing polymer having an acylazide group for use as a lubricant in the present process for producing an information recording medium is selected from compounds having a fluoropolyether chain or an alkyl chain as a basic structure and at least one acylazido group.

The fluoropolyether chain or fluoroalkyl chain may be not only linear, but also branched. The fluorine-containing polymer having at least one acylazido group includes, for example, $$N_3OC[(CF_2O)_n(CF_2CF_2O)_m]CON_3,$$

F(CFCF$_2$O)$_n$CFCON$_3$, etc.

Figure 4:
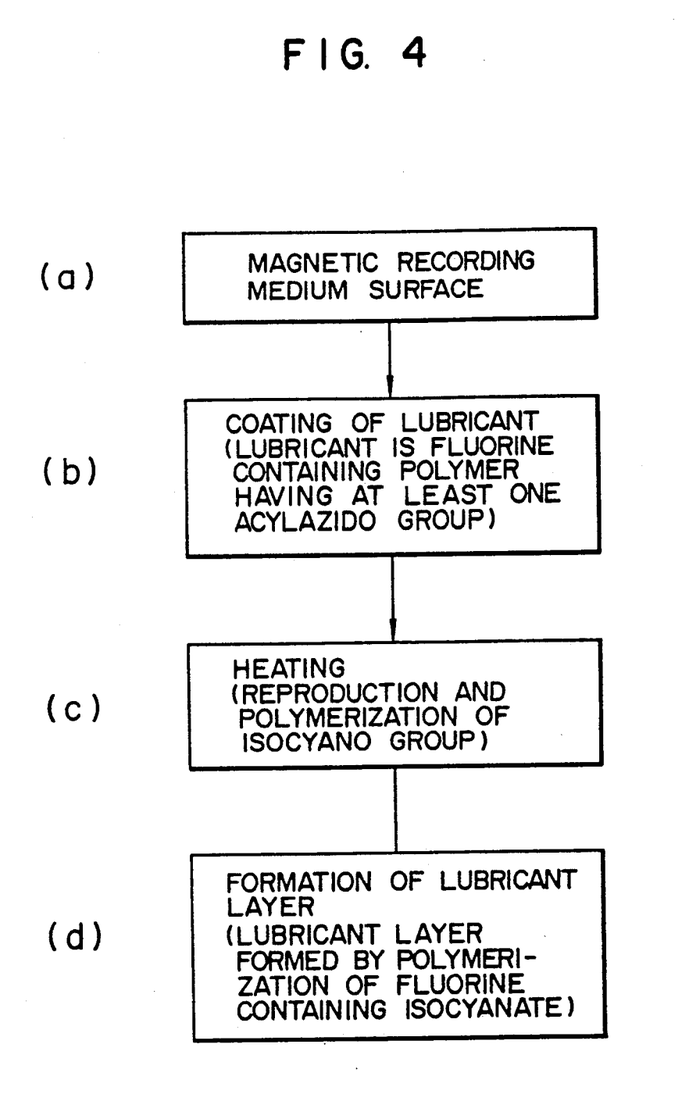

The fluorine-containing polymer having at least one acylazido group can be applied, as shown in FIG. 4(a) to (d), to the surface of a magnetic recording medium [FIG. 4(a)], for example, directly or in a solution state by spray-wiping, dipping, spin coating, etc. [FIG. 4(b)]. Then, the fluorine-containing polymer deposited on the surface of the polymer forms an isocyano group by heating [FIG. 4(c)] and the thus formed isocyano group undergoes polymerization to form a lubricant layer comprising the fluorine-containing isocyanate polymer [FIG. 4(d)].

The temperature required for the formation and polymerization of the isocyano group depends upon the species of the fluorine-containing polymers and is preferably in a range of 100° to 200° C., because the reaction proceeds slowly at a lower temperature, whereas deterioration of the medium is liable to occur at a higher temperature.

In the present invention, it is important to convert a fluorine-containing acylazide to a fluorine-containing isocyanate and subject the fluorine-containing isocyanate on the surface of an information recording medium, and compounds having different main chain structures, molecular weights, etc. from those of the fluorine-containing polymer can be also used.

BRIEF DESCRIPTION OF THE DRAWINGS

FIG. 3(a) to (d) show process steps of producing the present magnetic recording medium shown in Examples 1 to 23.

FIG. 4(a) to (d) show process steps of producing the present magnetic recording medium shown in Examples 24 to 27.

DETAILED DESCRIPTION OF THE PREFERRED EMBODIMENTS

Embodiments of synthesizing fluorine-containing isocyanate derivatives will be given below in Examples 1 to 4 at first.

EXAMPLE 1

20 g of perfluoropolyether -α,ω-dicarboxyamidetolyleneisocyanate represented by the following formula (1) was dissolved in 100 ml of 1,1,2-trifluorotrichloroethane (which will be hereinafter referred to as "freon").

(1)

The resulting solution was dried over anhydrous magnesium sulfate, admixed with 2 g of t-butyl alcohol and then refluxed for 6 hours.

After the end of the reaction, the solvent and unreacted t-butyl alcohol were removed therefrom by distillation under reduced pressure, whereby a compound of the following formula (2) was obtained.

(2)

Absorption by NCO group was not found at 2270 cm$^{-1}$ in the infrared spectrum, but absorption by proton of $^t$Bu was found at 1.2-1.8 ppm in the $^1$H-HMR spectrum.

The foregoing analytical results support the foregoing structure.

EXAMPLE 2

100 ml of a freon solution containing 20 g of fluorine-containing isocyanate of formula (1) was dried over anhydrous magnesium sulfate, admixed with 5 g of m-cresol and then refluxed for about 12 hours.

After the end of the reaction, the solvent was removed therefrom by distillation, and the residues were washed with benzene and dried, whereby a compound of the following formula (3) was obtained.

(3)

Absorption by NCO group at 2270 cm$^{-1}$ disappeared in the infrared spectrum, whereas a peak corresponding to m-cresol was found at m/e=108.14 in the pyrolysis gas chromatography-mass spectrometry.

The foregoing results support the foregoing structure.

EXAMPLE 3

100 ml of a freon solution containing 20 g of fluorine-containing isocyanate of formula (1) was dried over anhydrous magnesium sulfate and admixed with 50 ml of a tetrahydrofuran solution containing 3 g of potassium t-butoxide and 5 g of diethyl malonate in a dry nitrogen atmosphere, and the resulting mixture was stirred for 6 hours.

After the end of the reaction, the solvent was removed therefrom by distillation under reduced pressure and the residues were washed with absolute ethanol and dried, whereby a compound of the following formula (4) was obtained.

proton of ethyl group at $\delta$=4.0–4.6 ppm in the $^1$H-HMR spectrum.

The foregoing analytical results support the foregoing structure.

EXAMPLE 4

The reaction was carried out in the same manner as in Example 3 except that 3 g of acetylacetone was used in place of diethyl malonate, whereby a compound of the following formula (5) was obtained.

(5)

Absorption by NCO group disappeared at 2270 cm$^{-1}$ in the infrared spectrum, and proton of was found at $\delta$=2.1–2.6 ppm in the $^1$H-HMR spectrum.

The foregoing analytical results support the foregoing structure.

(4)

Absorption by NCO group at 2270 cm$^{-1}$ disappeared in the infrared spectrum, but methyl proton of ethyl group was found at $\delta$=1.1–1.5 ppm and methylene The structural formulae of the foregoing fluorine-containing isocyanate of formula (1) and fluorine-containing isocyanate derivatives of formulae (2) to (5) are summarized in Table 1.

TABLE 1

| Example No. | Compound formula No., (as shown in Table 1) | Structural formula of fluorine-containing isocyanate or fluorine-containing isocyanate derivative |
|---|---|---|
| — | 1 |  |

TABLE 1-continued

| Example No. | Compound formula No., (as shown in Table 1) | Structural formula of fluorine-containing isocyanate or fluorine-containing isocyanate derivative |
|---|---|---|
| 1 | 2 |  |
| 2 | 3 |  |
| 3 | 4 |  |
| 4 | 5 |  |

Embodiments of a process for producing a magnetic recording medium will be described below in Examples 5 to 14.

EXAMPLE 5

A freon solution containing 0.5 W/V % of fluorine-containing isocyanate derivative of formula (2) was applied by spraying to a coating magnetic recording disk, 5 inches in diameter, as a magnetic recording medium, prepared from a dispersion of magnetic powder ($\gamma$-$Fe_2O_3$) in a binder comprising epoxy, phenol and polyvinylbutyral resins. Then, the magnetic disk was heated at 200° C. for 2 hours to form a lubricant layer.

Then, a magnetic head with a piezo device on the arm was provided afloat over the magnetic disk at a distance of 0.2 μm to determine number of defects of the lubricant layer, which was defined by the number of peaks that exceeded 5 times the average output noise level of the piezo device. In this procedure, peaks were limited to those which exceeded 5 times the average output noise level, because the noise and defects were measured as separated.

Magnetic disk samples, each prepared by spraying a lubricant solution preserved for one hour, 10 days or one month after the preparation of the lubricant solution, were subjected to the tests to determine the number of defects according to the foregoing procedure. The results are shown in Table 2.

The number of lots was 1,000 and the thickness of the lubricant layer was about 100 Å.

EXAMPLE 6

Tests were carried out according to the same procedure as in Example 5, except that the compound of formula (3) was used as the fluorine-containing isocyanate derivative.

EXAMPLE 7

Tests were carried out according to the same procedure as in Example 5, except that the compound of formula (4) was used as the fluorine-containing isocyanate derivative.

EXAMPLE 8

Tests were carried out according to the same procedure as in Example 5, except that the compound of formula (5) was used as the fluorine-containing isocyanate derivative.

COMPARATIVE EXAMPLE 1

Tests were carried out according to the same procedure as in Example 5, except that the fluorine-containing isocyanate was used in place of the fluorine-containing isocyanate derivative.

Test results of Examples 6 to 8 and Comparative Example 1 are shown in Table 2 together with the results of Example 5.

TABLE 2

| Example or Comparative Example No. | Compound formula No. (as shown in Table 1) | Magnetic layer | Number of defects of lubricant layer ($10^{-3}$ defects/sheet) | | |
|---|---|---|---|---|---|
| | | | Lubricant solution preserved for one hour after preparation | Lubricant solution preserved for 10 days after preparation | Lubricant solution preserved for one month after preparation |
| Example 5 | 2 | coating type | 2 | 7 | 5 |
| Example 6 | 3 | coating type | 9 | 0 | 2 |
| Example 7 | 4 | coating type | 0 | 9 | 1 |
| Example 8 | 5 | coating type | 8 | 3 | 6 |
| Comp. Ex. 1 | 1 | coating type | 12 | 127 | 758 |

EXAMPLE 9

Magnetic disk samples were prepared in the same manner as in Example 5 with magnetic disks prepared by successively forming a Cr layer having a thickness of 0.25 μm on an NiP-plated, Al alloy substrate, a magnetic Co-Ni-Zr metal layer having a thickness of 0.06 μm and a protective carbon layer having a thickness of 0.05 μm thereon successively by RF sputtering in an Ar gas atmosphere, as magnetic recording media and with the compound of formula (4) as the fluorine-containing isocyanate derivative. Tests were carried out according to the same procedure as in Example 5 to determine the number of defects. The results are shown in Table 3.

EXAMPLE 10

Tests were carried out according to the same procedure as in Example 9, except that the compound of formula (5) was used as the fluorine-containing isocyanate derivative.

COMPARATIVE EXAMPLE 2

Tests were carried out according to the same procedure as in Example 9, except that the fluorine-containing isocyanate of formula (1) was used in place of the fluorine-containing isocyanate derivative.

Test results of Example 10 and Comparative Example 2 are shown in Table 3 together with those of Example 9.

applied to the magnetic disks, prepared in the same manner as in Example 9, by dipping, i.e. by immersing and pulling-up of the disks in the freon solution. Then, the magnetic disks were heated at 200° C. for two hours to form a lubricant layer.

Then, tests were carried out according to the same procedure as in Example 5 to determine the number of defects. The test results are shown in Table 4.

EXAMPLE 12

Tests were carried out according to the same procedure as in Example 11, except that the fluorine-containing isocyanate derivative of formula (3) was used.

EXAMPLE 13

Tests were carried out according to the same procedure as in Example 11, except that the fluorine-containing isocyanate derivative of formula (4) was used.

EXAMPLE 14

Tests were carried out according to the same procedure as in Example 11, except that the fluorine-containing isocyanate derivative of formula (5) was used.

COMPARATIVE EXAMPLE 3

Tests were carried out according to the same procedure as in Example 11, except that the fluorine-containing isocyanate of formula (1) was used in place of the fluorine-containing isocyanate derivative.

TABLE 3

| Example or Comparative Example No. | Compound formula No. (as shown in Table 1) | Magnetic layer | Number of defects of lubricant layer ($10^{-3}$ defects/sheet) | | |
|---|---|---|---|---|---|
| | | | Lubricant solution preserved for one hour after preparation | Lubricant solution preserved for 10 days after preparation | Lubricant solution preserved for one month after preparation |
| Example 9 | 4 | metal | 2 | 3 | 0 |
| Example 10 | 5 | " | 5 | 7 | 1 |
| Comp. Ex. 2 | 1 | " | 15 | 136 | 682 |

EXAMPLE 11

A freon solution containing 0.5 W/V % of fluorine-containing isocyanate derivative of formula (2) was Tests results of Examples 11 to 14 and Comparative Example 3 are shown in Table 4.

TABLE 4

| Example or Comparative Example No. | Compound formula No. (as shown in Table 1) | Number of defects of lubricant layer ($10^{-3}$ defects/sheet) | | |
|---|---|---|---|---|
| | | Lubricant solution preserved for one hour after preparation | Lubricant solution preserved for 10 days after preparation | Lubricant solution preserved for one month after preparation |
| Example 11 | 2 | 0 | 2 | 0 |
| Example 12 | 3 | 1 | 6 | 0 |
| Example 13 | 4 | 5 | 7 | 3 |
| Example 14 | 5 | 4 | 8 | 3 |
| Comp. Ex. 3 | 1 | 21 | 224 | 859 |

The following facts can be seen from the foregoing Examples 1 to 14 and Comparative Examples 1 to 3.

When lubricant layers are formed by spray coating, the number of defects is higher by at least one order in case of preservation for 10 days or much higher in case of preservation for one month after the preparation according to the conventional process using the fluorine-containing isocyanate (Comparative Example 1) than according to the present process (Examples 5 to 8), as is evident from Table 2. A stable lubricant layer with smaller number of defects even after the prolonged preservation of the lubricant solution can be obtained according to the present invention using isocyano group-protected compounds.

The present invention is effective not only for the coating type magnetic layer, but also for the metal-type magnetic layer, as is evident from Comparative Example 2 and Examples 9 and 10 in Table 3.

Furthermore, the present invention is effective not only for the spray coating, but also for the dip coating, as is evident from Comparative Example 3 and Examples 11 to 14 in Table 4.

Freon solutions containing 2 W/V % of the compounds of formulae (1) to (5), respectively, were prepared, sealed with air having a relative humidity, RH, of 60% (27° C.) and left standing at 27° C. It was found that solid insoluble matters were formed from the compound of formula (1) with no protection of the isocyano group after two weeks, whereas no solid insoluble matters were formed from the compounds of formulae (2) to (5) with protection of the isocyano group, prepared in Examples 1 to 4, even after being left standing for one month, and the lubricant solutions were stable. Thus, the change with time is effectively smaller when these compounds of formulae (2) to (5) are used as lubricant solutions.

In the foregoing Examples and Comparative Examples, the number of defects on the lubricant layer having a thickness of 100 Å was determined, but similar results were also obtained when the lubricant layers of different thickness were formed.

In the foregoing Comparative Examples 1 to 3 and Examples 5 to 14, filtration through a filter, 0.2 μm in pore diameter, was carried out before the application of the lubricant. Thus, the number of defects was smaller by about 30% even in Comparative Examples 1 to 3. The solid matters of a lubricant can be removed to some degree by filtration to reduce the number of defects, but the effect of the reduction by filtration is not so remarkable as that by the protection of isocyano group as in the present invention.

As described above, referring to the foregoing embodiments of the present invention, a stable lubricant layer with less defects can be obtained even after the prolonged preservation of the lubricant solution according to the present invention.

In the following Examples 15 to 23, it will be shown that the lubricant layer formed according to the present invention has distinguished sliding characteristics.

EXAMPLE 15

The fluorine-containing isocyanate derivative of formula (2) was applied to a desired thickness to a coating magnetic disk, 5 inches in diameter, as a magnetic recording medium, prepared from a dispersion of magnetic powder ($\gamma$-$Fe_2O_3$) in a binder comprising epoxy, phenol and polyvinylbutyral resins. Application of the lubricant was carried out by spray-coating the lubricant in the form of a freon solution and wiping the lubricant in excess with a gauze tape until the lubricant layer had the desired thickness, while rotating the magnetic disk.

The thickness of the lubricant layer was measured by a Fourier transform infrared spectrometer.

Then, the magnetic disk was heated at 200° C. for 2 hours to form a lubricant layer.

Sliding strength against a magnetic head was determined as a sliding endurance by sliding a sapphire slider (spherical slider with a radius of curvature of 50 mm) under a load of 20 g on the surface of the thus prepared magnetic disk repeatedly at a sliding speed of 20 m/sec. and measuring the number of sliding repetitions until a scratch was developed on the surface of the disk.

EXAMPLE 16

Test was carried out in the same manner as in Example 15, except that the compound of formula (3) was used as the fluorine-containing isocyanate derivative.

EXAMPLE 17

Test was carried out in the same manner as in Example 15, except that the compound of formula (4) was used a the fluorine-containing isocyanate derivative.

EXAMPLE 18

Test was carried out in the same manner as in Example 15, except that the compound of formula (5) was used as the fluorine-containing isocyanate derivative.

COMPARATIVE EXAMPLE 4

Test was carried out in the same manner as in Example 15, except that the fluorine-containing isocyanate of formula (1) was used in place of the fluorine-containing isocyanate derivative.

Test results of Examples 15 to 18 and Comparative Example 4 are shown in Table 5.

TABLE 5

| Example or Comparative Example No. | Compound formula No, (as shown in Table 1) | Lubricant layer thickness (Å) | Sliding strength (K repetitions) |
|---|---|---|---|
| Example 15 | 2 | 108 | 46.5 |
| Example 16 | 3 | 105 | 48.9 |
| Example 17 | 4 | 110 | 45.5 |
| Example 18 | 5 | 100 | 47.0 |
| Comp. Ex. 4 | 1 | 115 | 15.6 |

EXAMPLE 19

A lubricant layer was formed in the same manner as in Example 15, except that a magnetic disk, prepared by forming a Cr layer having a thickness of 0.25 μm on an NiP-plated, Al alloy substrate, a magnetic Co-Ni-Zr metal layer having a thickness of 0.06 μm and a protective carbon layer having a thickness of 0.05 μm thereon successively by RF sputtering in an Ar gas atmosphere, was used as a magnetic recording medium and the fluorine-containing isocyanate derivative of formula (2) was used as a lubricant.

The sliding strength was measured with a sapphire slider (radius of curvature: 50 mm) under a load of 20 g at a sliding speed of 20 m/sec according to the same sliding test procedure as described before.

EXAMPLE 20

Test was carried out in the same manner as in Example 19, except that the compound of formula (3) was used as the fluorine-containing isocyanate derivative.

EXAMPLE 21

Test was carried out in the same manner as in Example 19, except that the compound of formula (4) was used as the fluorine-containing isocyanate derivative.

COMPARATIVE EXAMPLE 5

Test was carried out in the same manner as in Example 19, except that the fluorine-containing isocyanate of formula (1) was used in place of the fluorine-containing isocyanate derivative.

Test results of Examples 19 to 21 and Comparative Example 5 are shown in Table 6.

TABLE 6

| Example or Comparative Example No. | Compound formula No, (as shown in Table 1) | Lubricant layer thickness (Å) | Sliding strength (K repetitions) |
|---|---|---|---|
| Example 19 | 2 | 95 | 44.8 |
| Example 20 | 3 | 110 | 43.9 |
| Example 21 | 4 | 108 | 45.2 |
| Comp. Ex. 5 | 1 | 105 | 13.7 |

EXAMPLE 22

A lubricant layer was formed in the same manner as in Example 15, except that a floppy disk, prepared by successively vapor-depositing a magnetic Co-Cr metal layer having a thickness of 0.22 μm and a protective boron layer having a thickness of 0.02 μm on a polyimide film, was used as a magnetic recording medium and the fluorine-containing isocyanate derivative of formula (2) was used as the lubricant.

Sliding strength was measured with a sapphire slider (radius of curvature: 50 mm) under a load of 20 g at a sliding speed of 2 m/sec. according to the same sliding test procedure as described before, by bonding the floppy disk to a glass plate.

EXAMPLE 23

Test was carried out in the same manner as in Example 22, except that the compound of formula (5) was used as the fluorine-containing isocyanate derivative.

COMPARATIVE EXAMPLE 6

Test was carried out in the same manner as in Example 22, except that the fluorine-containing isocyanate of formula (1) was used in place of the fluorine-containing isocyanate derivative.

Test results of Examples 22 and 23 and Comparative Example 6 are shown in Table 7.

TABLE 7

| Example or Comparative Example No. | Compound formula No., (as shown in Table 1) | Lubricant layer thickness (Å) | Sliding strength (K repetitions) |
|---|---|---|---|
| Example 22 | 2 | 95 | 2250 |
| Example 23 | 5 | 92 | 2360 |
| Comp. Ex. 6 | 1 | 102 | 812 |

The following facts can be seen from the foregoing Examples 15 to 23 and Comparative Examples 4 to 6.

Comparison of Examples 15 to 18 with Comparative Example 4, where the layer thickness is substantially equal to one another, reveals that the sliding strength of the present magnetic disks is about 3 times as high as that of the conventional disk, as is evident from Table 5.

As is evident from Examples 19 to 21 of Table 6 and Examples 22 and 23 of Table7, not only the coating magnetic layer, but also the magnetic metal layer can have a distinguished sliding strength in the present invention.

As described in detail in the foregoing Examples, the present magnetic recording medium has good sliding strength, durability and reliability required for the magnetic recording medium.

In the present process for forming a lubricant layer of a magnetic recording medium of Examples 1 to 23, the hydrolyzability and self-polymerizability can be overcome by the stabilization of the isocyano group of the fluorine-containing isocyanate, and a stable production process of a lubricant layer with less defects can be obtained even after a prolonged preservation of the lubricant solution. A magnetic recording medium with good durability and reliability can be produced in the present invention.

The present invention is effective not only for the coating magnetic recording medium, a sputtered metal type, magnetic recording medium of, for example, Co-Ni-Zr, etc., a magnetic metal layer formed by plating or vacuum vapor deposition, and a magnetic recording medium with a protective layer of carbon, boron, etc. on the magnetic layer, but also for the magnetic recording medium with a lubricant-impregnated porous surface.

Synthesis of fluorine-containing polymers having at least one acylazido group will be described in the following Examples 24 and 25.

EXAMPLE 24

1.5 g of hydrazine monohydrate was slowly dropwise added to a solution containing 20 g of perfluoropolyether-$\alpha,\omega$-diacid dimethylester (average molecular weight:

2,000), represented by the following formula (6) and the mixture was subjected to reaction at room temperature for 4 hours with stirring.

$$CH_3O_2C[(CF_2O)_n(CF_2CF_2O)_m]CO_2CO_3 \qquad (6)$$

After the end of the reaction, unreacted hydrazine was removed therefrom by distillation under reduced pressure, whereby a compound represented by the following formula (7) was obtained.

$$H_2NNHOC[(CF_2O)_n(CF_2CF_2O)_m]CONHNH_2 \qquad (7)$$

1.8 g of sodium nitrite was added to 20 g of the compound of formula (7). Then, the mixture was ice cooled to 0°–5° C. and slowly admixed with 50 ml of 5% hydrochloric acid dropwise. After the dropwise addition, the mixture was further ice cooled and stirred for 6 hours. Then, the mixture was washed with water and dissolved in 1,1,2-trichlorotrifluoroethane, which will be hereinafter referred to as "freon". Then, the resulting solution was dried over anhydrous magnetism sulfate and the solvent was removed therefrom by distillation, whereby a compound represented by the following formula (8) was obtained.

$$N_3OC[(CF_2O)_n(CF_2CF_2O)_m]CON_3 \qquad (8)$$

In the infrared spectrum of the compound of formula (8), an absorption of azido group was found at 2200 cm$^{-1}$.

EXAMPLE 25

1 g of hydrazine monohydrate was dropwise added to a solution containing 25 g of ω-polyhexafluoropropylene-oxide acid methylester (average molecular weight: 2,500) represented by the following formula (9) and the mixture was subjected to reaction at room temperature for 2 hours with stirring. After the end of the reaction, unreacted hydrazine was removed therefrom by distillation under reduced pressure, whereby a compound represented by the following formula (10) was obtained.

$$F(CFCF_2O)_nCFCO_2CH_3 \qquad (9)$$
$$\quad |\qquad\quad |$$
$$CF_3\qquad CF_3$$

$$F(CFCF_2O)_nCFCONHNH_2 \qquad (10)$$
$$\quad |\qquad\quad |$$
$$CF_3\qquad CF_3$$

1 g of sodium nitrite was added to 25 g of the compound of formula (10). The mixture was ice cooled to 0°–5° C. and dropwise admixed with 50 ml of 5% hydrochloric acid. After the dropwise addition, the mixture was ice cooled and stirred for 6 hours.

Then, the mixture was washed with water and made into a freon solution. Then, the solution was dried over anhydrous magnesium sulfate and the solvent was removed therefrom by distillation, whereby a compound represented by the following formula (II) was obtained.

$$F(CFCF_2O)_nCFCON_3 \qquad (11)$$
$$\quad |\qquad\quad |$$
$$CF_3\qquad CF_3$$

In the infrared spectrum of the compound of formula (11), an absorption of azido group was found at 2,200 cm$^{-1}$.

Synthesis of fluorine-containing isocyanates used as comparative compounds will be shown in the following Comparative Examples 7 and 8.

COMPARATIVE EXAMPLE 7

10 g of the compound of formula (8) synthesized in Example 24 was heated at 90° C. in a dry nitrogen atmosphere for about one hour, whereby a fluorine-containing isocyanate represented by the following formula (12) was obtained.

$$ONC[(CF_2O)_n(CF_2CF_2O)_m]NCO \qquad (12)$$

In the infrared spectrum of the compound of formula (12), an absorption of isocyano group was found at 2,300 cm$^{-1}$.

COMPARATIVE EXAMPLE 8

10 g of the compound of formula (11) synthesized in Example 25 was heated at 90° C. in a dry nitrogen atmosphere for about one hour, whereby a fluorine-containing isocyanate represented by the following formula (13) was obtained.

$$F(CFCF_2O)_nCFNCO \qquad (13)$$
$$\quad |\qquad\quad |$$
$$CF_3\qquad CF_3$$

In the infrared spectrum of the compound of formula (13), an absorption of isocyano group was found at 2,300 cm$^{-1}$.

Structural formulae of fluorine-containing acylazides of formulae (8) and (11) and fluorine-containing isocyanates of formulae (12) and (13) ar summarized in Table 8.

TABLE 8

| Example No. | Comp. Ex. No. | Compound formula No. | Structural formulae of fluorine-containing acylazides and isocyanates |
|---|---|---|---|
| 24 | — | 8 | $N_3OC[(CF_2O)_n(CF_2CF_2O)_m]CON_3$ |
| 25 | — | 11 | $F(CFCF_2O)_nCFCON_3$<br>$\quad\|\qquad\quad\|$<br>$CF_3\qquad CF_3$ |
| — | 7 | 12 | $OCN[(CF_2O)_n(CF_2CF_2O)_m]NCO$ |
| — | 8 | 13 | $F(CFCF_2O)_nCFCON$<br>$\quad\|\qquad\quad\|$<br>$CF_3\qquad CF_3$ |

Application of the present fluorine-containing polymers having at least one acylazido group to a magnetic recording medium will be shown in the following Examples 26 to 31.

EXAMPLE 26

Figure 1:
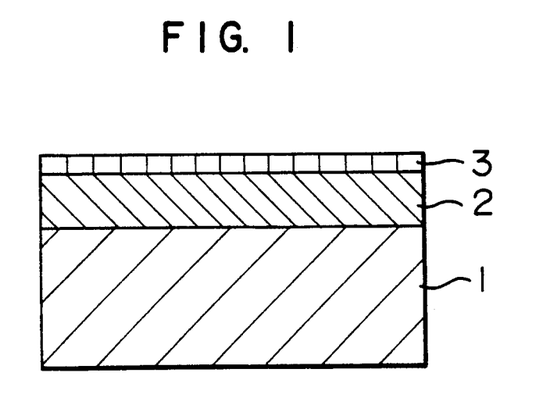
FIG. 1 is a schematic view showing the cross-sectional structure of a magnetic recording medium of the present invention shown in Example 26.

A freon solution containing 0.5 W/V % of fluorine-containing acylazide of formula (8) was applied by spray coating to a coating magnetic disk, 5 inches in diameter, with a magnetic layer 2, prepared from a dispersion of powder (γ-Fe$_2$O$_3$) in a binder comprising epoxy, phenol and polyvinylbutyral resins on a substrate 1, as shown in FIG. 1, as a magnetic recording medium. Then, the magnetic disk was heated at 200° C. for 2 hours to form a lubricant layer 3.

The thus prepared magnetic disk was provided afloat with a magnetic head with a piezo device on the arm at a distance of 0.2 μm to determine number of defects of the lubricant layer, which was defined by the number of peaks that exceeded 5 times the average output noise level of the piezo device. In this procedure, peaks were limited to those which exceeded 5 times the average output noise level, because the noise and defects were measured as separated.

Magnetic disk samples, each prepared by spraying a lubricant solution preserved for one hour, 10 days or one month after the preparation of the lubricant solution, were subjected to the tests to determine the number of defects according to the foregoing procedure. The results are shown in Table 9.

The number of lots was 1,000 and the thickness of the lubricant layer was about 100 Å.

EXAMPLE 27

Samples were prepared in the same manner as in Example 26, except that the compound of formula (11) was used as the fluorine-containing acylazide compound.

COMPARATIVE EXAMPLE 9

Samples were prepared in the same manner as in Example 26, except that the fluorine-containing isocyanate of formula (12) was used in place of the fluorine-containing acylazide compound.

COMPARATIVE EXAMPLE 10

Samples were prepared in the same manner as in Example 26, except that the fluorine-containing isocyanate of formula (13) was used in place of the fluorine-containing acylazide compound.

Test results of samples prepared in the foregoing Examples 26 and 27, and Comparative Examples 9 and 10 are summarized in Table 9.

TABLE 9

| | | | Number of defects of lubricant layer ($10^{-3}$ defects/sheet) | | |
|---|---|---|---|---|---|
| Example or Comparative Example No. | Compound formula No., (as shown in Table 8) | Magnetic layer | Lubricant solution preserved for one hour after preparation | Lubricant solution preserved for 10 days after preparation | Lubricant solution preserved for one month after preparation |
| Example 26 | 8 | Coating type | 6 | 9 | 3 |
| Example 27 | 11 | Coating type | 4 | 0 | 2 |
| Comp. Ex. 9 | 12 | Coating type | 17 | 135 | 823 |
| Comp. Ex. 10 | 13 | Coating type | 14 | 116 | 762 |

EXAMPLE 28

Figure 2:
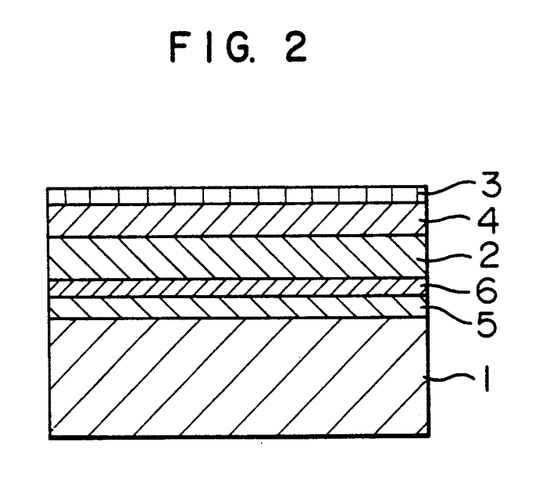
FIG. 2 is a schematic view showing the cross-sectional structure of a magnetic disk of the present invention shown in Example 28.

On a magnetic disk prepared by forming a Cr layer 6 having a thickness of 0.25 μm on a NiP-plated Al alloy substrate 1 (NiP plate 5) by RF sputtering in an Ar gas atmosphere, a magnetic metal layer 2' of Co-Ni-Zr alloy having a thickness of 0.06 μm and a protective carbon layer 4 having a thickness of 0.05 μm thereon successively by RF sputtering in an argon gas atmosphere, as a magnetic recording medium, a lubricant layer 3 was formed with the fluorine-containing acylazide compound of formula (8) in the same manner as in Example 26, as shown in FIG. 2.

EXAMPLE 29

Samples were prepared in the same manner as in Example 28, except that the compound of formula (11) was used as the fluorine-containing acylazide compound.

COMPARATIVE EXAMPLE 11

Samples were prepared in the same manner as in Example 28, except that the fluorine-containing isocyanate of formula (12) was used in place of the fluorine-containing acylazide compound.

Test results of determining the number of defects on the lubricant layer of the foregoing Examples 28 and 29 and Comparative Example 11 are summarized in Table 10.

TABLE 10

| | | | Number of defects of lubricant layer ($10^{-3}$ defects/sheet) | | |
|---|---|---|---|---|---|
| Example or Comparative Example No. | Compound formula No., (as shown in Table 8) | Magnetic layer | Lubricant solution preserved for one hour after preparation | Lubricant solution preserved for 10 days after preparation | Lubricant solution preserved for one month after preparation |
| Example 28 | 8 | metal | 4 | 0 | 0 |
| Example 29 | 11 | " | 2 | 7 | 1 |
| Comp. Ex. 11 | 12 | " | 11 | 118 | 702 |

EXAMPLE 30

The magnetic disk prepared and used as in Example 28 was dipped in a freon solution containing 0.5 W/V % of fluorine-containing acylazide compound of formula (8) and pulled up. Then, the magnetic disk was heated at 200° C. for 2 hours to form a lubricant layer.

EXAMPLE 31

Samples were prepared in the same manner as in Example 30, except that the fluorine-containing acylazide of formula (11) was used.

COMPARATIVE EXAMPLE 12

Samples were prepared in the same manner as in Example 30, except that the fluorine-containing isocyanate of formula (13) was used in place of the fluorine-containing acylazide compound.

Test results of determining the number of defects of the lubricant layer o the foregoing Examples 30 and 31 and Comparative Example 12 are summarized in Table 11.

TABLE 11

| Example or Comparative Example No. | Compound formula No., (as shown in Table 8) | Magnetic layer | Number of defects of lubricant layer ($10^{-3}$ defects/sheet) | | |
|---|---|---|---|---|---|
| | | | Lubricant solution preserved for one hour after preparation | Lubricant solution preserved for 10 days after preparation | Lubricant solution preserved for one month after preparation |
| Example 30 | 8 | metal | 1 | 2 | 0 |
| Example 31 | 11 | " | 4 | 6 | 3 |
| Comp. Ex. 12 | 13 | " | 24 | 209 | 847 |

The following facts can be seen from the foregoing Examples 26 to 31 and Comparative Examples 9 to 12.

When lubricant layers are formed by spray coating, the number of defects is higher by at least one order in case of preservation for 10 days or much higher in case of preservation for one month after the preparation according to the conventional process using the fluorine-containing isocyanate (Comparative Examples 9 and 10) than according to the present invention (Examples 26 and 27), as is evident from Table 9. A stable production process of a lubricant layer with small number of defects even after the prolonged preservation of the lubricant solution can be obtained according to the present invention using fluorine-containing acylazides.

The present invention is effective not only for the coating type magnetic layer, but also for metal-type magnetic layer, as is evident from Comparative Example 11 and Examples 28 and 29 in Table 10.

Furthermore, the present invention is effective not only for the spray coating, but also the dip coating, as is evident from Comparative Example 12 and Examples 30 and 31 in Table 11.

Freon solutions containing 2 W/V % of the compounds of formulae (8), (11), (12) and (13), respectively, were prepared, sealed with air having a relative humidity, RH, of 60% (27° C.) and left standing at 27° C. It was found that solid insoluble matters were formed from the compounds having isocyano group of formulae (12) and (13) after two weeks, whereas no solid insoluble matters were formed from the compounds of formulae (8) and (11) prepared in Examples 24 and 25 according to the present invention using the fluorine-containing acylazides, even after being left standing for one month, and the lubricant solutions were stable. Thus, the change with time is effectively smaller when the compounds of formulae (8) and (11) are used as lubricant solutions.

In the foregoing Examples and Comparative Examples, the number of defects of the lubricant layer having a thickness of 100 Å was determined, but similar results were also obtained when the lubricant layers of different thickness were formed.

In the foregoing Comparative Examples 9 to 12 and Examples 26 to 31, filtration through a filter, 0.2 μm in pore diameter, was carried out before the application of the lubricant. Thus, the number of defects was smaller by about 30% even in Comparative Examples 9 to 12. The solid matters of a lubricant can be removed to some degree by filtration to reduce the number of defects, but the effect of the reduction by filtration is not so remarkable as that by using the fluorine-containing acylazides as in the present invention.

As described above, referring to the foregoing embodiments of the present invention, a stable production process of a lubricant layer with less defects can be obtained even after the prolonged preservation of the lubricant solution according to the present invention.

In the following Examples 32 to 37, it will be shown that the lubricant layer formed according to the present invention has distinguished sliding characteristics.

EXAMPLE 32

The fluorine-containing acylazide of formula (8) was applied to a desired thickness to a coating magnetic disk, 5 inches in diameter, as a magnetic recording medium, prepared from a dispersion of magnetic powder ($\gamma$-$Fe_2O_3$) in a binder comprising epoxy, phenol and polyvinylbutyral resins. Application of the lubricant was carried out by spray-coating the lubricant in the form of a freon solution and wiping the lubricant in excess with a gauze tape until the lubricant layer had the desired thickness, while rotating the magnetic disk.

The thickness of the lubricant layer was measured by a Fourier transform infrared spectrometer.

Then, the magnetic disk was heated at 200° C. for 2 hours to form a lubricant layer.

Sliding strength against a magnetic head was determined as a sliding endurance by sliding a sapphire slider (spherical slider with a radius of curvature of 50 mm) under a load of 20 g on the surface of the thus prepared magnetic disk repeatedly at a sliding speed of 20 m/sec. and measuring the number of sliding repetitions until a scratch was developed on the surface of the disk.

EXAMPLE 33

A sample was prepared in the same manner as in Example 32, except that the fluorine-containing acylazide compound of formula (11) was used.

COMPARATIVE EXAMPLE 13

A sample was prepared in the same manner as in Example 32, except that the fluorine-containing isocyanate of formula (12) was used in place of the fluorine-containing acylazide compound.

Test results of the foregoing Examples 32 and and Comparative Example 13 are shown in Table 12.

TABLE 12

| Example or Comparative Example No. | Compound formula No., (as shown in Table 8) | Lubricant layer thickness (Å) | Sliding strength (K repetitions) |
| --- | --- | --- | --- |
| Example 32 | 8 | 107 | 49.5 |
| Example 33 | 11 | 105 | 48.2 |
| Comp. Ex. 13 | 12 | 111 | 14.3 |

EXAMPLE 34

A lubricant layer was formed in the same manner as in Example 32, except that a magnetic disk, prepared by forming a Cr layer having a thickness of 0.25 μm on an NiP-plated, Al alloy substrate, a magnetic Co-Ni-Zr metal layer having a thickness of 0.06 μm and a protective carbon layer having a thickness of 0.05 μm thereon successively by RF sputtering in an Ar gas atmosphere, was used as a magnetic recording medium and the fluorine-containing acylazide compound of formula (8) was used as a lubricant.

The sliding strength was measured with a sapphire slider (radius of curvature: 50 mm) under a load of 20 g at a sliding speed of 20 m/sec according to the same sliding test procedure as described before.

EXAMPLE 35

A sample was prepared in the same manner as in Example 34, except that the fluorine-containing acylazide compound of formula (11) was used.

COMPARATIVE EXAMPLE 14

A sample was prepared in the same manner as in Example 34, except that the fluorine-containing isocyanate of formula (12) was used in place of the fluorine-containing acylazide compound.

Test results of the foregoing Examples 34 and 35 and Comparative Example 14 are shown in Table 13.

TABLE 13

| Example or Comparative Example No. | Compound formula No., (as shown in Table 8) | Lubricant layer thickness (Å) | Sliding strength (K repetitions) |
| --- | --- | --- | --- |
| Example 34 | 8 | 98 | 45.3 |
| Example 35 | 11 | 102 | 42.1 |
| Comp. Ex. 14 | 12 | 105 | 12.9 |

EXAMPLE 36

A lubricant layer was formed in the same manner as in Example 32, except that a floppy disk, prepared by successively vapor-depositing a magnetic Co-Cr metal having a thickness of 0.22 μm and a protective boron layer having a thickness of 0.02 μm on a polyimide film, was used as a magnetic recording medium and the fluorine-containing acylazide compound of formula (8) was used as the lubricant.

Sliding strength was measured with a sapphire slider (radius of curvature: 50 mm) under a load of 20 g at a sliding speed of 20 m/sec. according to the same sliding test procedure as described before by bonding the floppy disk to a glass plate.

EXAMPLE 37

A sample was prepared in the same manner as in Example 36, except that the fluorine-containing acylazide compound of formula (11) was used.

COMPARATIVE EXAMPLE 15

A sample was prepared in the same manner as in Example 36, except that the fluorine-containing isocyanate of formula (12) was used in place of the fluorine-containing acylazide compound.

Test results of the foregoing Examples 36 and and Comparative Example 14 are shown in Table 14.

TABLE 14

| Example or Comparative Example No. | Compound formula No., (as shown in Table 8) | Lubricant layer thickness (Å) | Sliding strength (K repetitions) |
| --- | --- | --- | --- |
| Example 36 | 8 | 100 | 2283 |
| Example 37 | 11 | 97 | 2195 |
| Comp. Ex. 15 | 12 | 104 | 721 |

The following facts can be seen from the foregoing Examples 32 to 37 and Comparative Examples 13 to 15.

Comparison of Examples 32 and 33 with Comparative Example 13, where the layer thickness is substantially equal to one another, reveals that the sliding strength of the present magnetic disks is about 3 times as high as that of the conventional disk, as is evident from Table 12.

As is evident from Examples 34 and 35 of Table 13 and Examples 36 and 37 of Table 14, not only the magnetic metal layer, but also the coating magnetic layer can have a distinguished sliding strength in the present invention.

As described in detail in the foregoing Examples, the present magnetic recording medium has good sliding strength, durability and reliability required for the magnetic recording medium.

In the present process for forming a lubricant layer of a magnetic recording medium of Examples 34 to 37, a stable production process of a lubricant layer with less deflects can be formed even after prolonged preservation of the lubricant solution without any influence of the hydrolyzability and self-polymerization of the fluorine-containing isocyanate by virtue of using a fluorine-containing acylazide as a lubricant and forming the fluorine-containing isocyanate on the surface of the medium. Thus, a magnetic recording medium with good reliability and durability can be produced in the present invention.

The present invention is effective not only for the coating magnetic recording medium, a sputtered metal type, magnetic recording medium of, for example, Co-Ni-Zr, etc., a magnetic metal layer formed by plating or a vacuum vapor deposition, and a magnetic recording medium with a protective layer of carbon, boron, etc. on the magnetic layer, but also for a magnetic recording medium with lubricant-impregnated porous surface.

What is claimed is:

1. A process for producing an information recording medium comprising a substrate, a magnetic layer formed on the substrate and a lubricant layer formed on the magnetic layer, which comprises forming the lubricant layer by applying a fluorine-containing isocyanate derivative, whose isocyano group is protected, to the magnetic layer, then reproducing the isocyano group and subjecting the reproduced isocyano group to polymerization, thereby forming a fluorine-containing isocyanate polymer layer.

2. A process according to claim 1, wherein an underlayer is formed between the substrate and the magnetic layer.

3. A process according to claim 1, wherein a protective layer is formed between the substrate and the lubricant layer.

4. A process according to claim 3, wherein an underlayer is formed between the substrate and the magnetic layer.

5. A process according to claim 1, wherein the reproduction and polymerization of the isocyano group are carried out by heating.

6. A process for producing an information recording medium comprising a substrate, a magnetic layer formed on the substrate and a lubricant layer formed on the magnetic layer, which comprises forming the lubricant layer by applying a fluorine-containing polymer having a fluoropolyether chain or an alkyl chain as a basic skeleton and at least one acylazido group to the magnetic layer, subjecting the medium to heat treatment, thereby forming an isocyano group on the fluorine-containing polymer, and subjecting the isocyano group to polymerization, thereby forming a fluorine-containing isocyanate polymer layer.

7. A process according to claim 6, wherein an underlayer is formed between the substrate and the magnetic layer.

8. A process according to claim 6, wherein a protective layer is formed between the substrate and the lubricant layer.

9. A process according to claim 8, wherein an underlayer is formed between the substrate and the magnetic layer.

10. A process according to claim 6, wherein the heat treatment is carried out at 100°–200° C.

* * * * *